United States Patent
Lin et al.

(10) Patent No.: US 10,218,145 B1
(45) Date of Patent: Feb. 26, 2019

(54) VORTEX LASER GENERATION DEVICE IN DEGENERATE CAVITY WITH SPIRAL PHASE ELEMENT AND VORTEX LASER GENERATION METHOD

(71) Applicant: National Sun Yat-sen University, Kaohsiung (TW)

(72) Inventors: Yuan-Yao Lin, Kaohsiung (TW); Yen-Yin Lin, Kaohsiung (TW); Shou-Tai Lin, Kaohsiung (TW); An-Chung Chiang, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 16/025,358

(22) Filed: Jul. 2, 2018

(51) Int. Cl.
| | |
|---|---|
| H01S 3/094 | (2006.01) |
| H01S 3/10 | (2006.01) |
| H01S 3/16 | (2006.01) |
| H01S 3/06 | (2006.01) |
| H01S 3/08 | (2006.01) |

(52) U.S. Cl.
CPC ........ H01S 3/10053 (2013.01); H01S 3/0621 (2013.01); H01S 3/08059 (2013.01); H01S 3/094038 (2013.01); H01S 3/1611 (2013.01); H01S 3/1643 (2013.01)

(58) Field of Classification Search
CPC .............. H01S 3/10053; H01S 3/1611; H01S 3/094038; H01S 3/0621
USPC ......................................................... 372/23
See application file for complete search history.

(56) References Cited

U.S. PATENT DOCUMENTS

| | | | | |
|---|---|---|---|---|
| 4,242,647 A * | 12/1980 | Macken | ................... | H01S 3/036 372/34 |
| 4,284,962 A * | 8/1981 | Esterowitz | .......... | H01S 3/09403 372/41 |
| 5,513,205 A * | 4/1996 | Rubinstein | .......... | H01S 3/08059 372/71 |
| 5,708,672 A * | 1/1998 | Pessot | ................... | H01S 3/0627 372/23 |
| 10,036,886 B2 * | 7/2018 | Tabirian | ............... | G02B 5/1828 |
| 2005/0030988 A1 * | 2/2005 | Nolan | ................. | H01S 5/02423 372/35 |
| 2009/0141216 A1 * | 6/2009 | Marrucci | .............. | G02F 1/0305 349/98 |
| 2017/0346257 A1 * | 11/2017 | Garnache-Creuillot | ..................... | H01S 5/14 |

OTHER PUBLICATIONS

Lin, et al., "Generation of optical vortices in a degenerate optical resonator with an intra-cavity spiral phase plate", arXiv:1707.00467 [physics.optics], Jul. 3, 2017, pp. 1-5.

(Continued)

*Primary Examiner* — Tuan N Nguyen
(74) *Attorney, Agent, or Firm* — Muncy, Geissler, Olds & Lowe, P.C.

(57) ABSTRACT

A vortex laser generation device in a degenerate cavity with a spiral phase element and a vortex laser generation method are provided. The vortex laser generation device has a degenerate cavity, and the degenerate cavity has a resonator mirror, a gain medium, an optical element, and an output coupler. The off-axis beams are formed in multiple pass transverse modes to resonate by disposing an optical element in the degenerate cavity, so that a vortex laser with orbital angular momentum can be generated.

8 Claims, 3 Drawing Sheets

(56) References Cited

OTHER PUBLICATIONS

Lin, et al., "Vortex laser generation in a degenerate optical resonator with an intra-cavity spiral phase plate", OSA Laser Congress, Oct. 2, 2017, pp. 1-3.

Lin, et al., "Optical vortex lasers by the coherent superposition of off-axis multiple-pass transverse modes in an azimuthal symmetry breaking laser resonator", Journal of Optics, vol. 20, No. 7, Jun. 14, 2018, pp. 1-9.

* cited by examiner

VORTEX LASER GENERATION DEVICE IN DEGENERATE CAVITY WITH SPIRAL PHASE ELEMENT AND VORTEX LASER GENERATION METHOD

CROSS REFERENCE TO RELATED APPLICATIONS

This invention is partly disclosed in theses entitled "Generation of optical vortices in a degenerate optical resonator with an intra-cavity spiral phase plate" on Jul. 3, 2017 completed by Yuan-Yao Lin, Chia-Chi Yeh and Hsien-Che Lee; "Vortex laser generation in a degenerate optical resonator with an intra-cavity spiral phase plate" on Oct. 2, 2017 completed by Yuan-Yao Lin, Chia-Chi Yeh, and Hsien-Che Lee; and "Optical vortex lasers by the coherent superposition of off-axis multiple-pass transverse modes in an azimuthal symmetry breaking laser resonator" on Jun. 14, 2018 completed by Yuan-Yao Lin, Chia-Chi Yeh, Hsien-Che Lee, Shang-Lin Yang, Jhih-He Tu and Chun-Po Tang, and thus the contents of which are herein incorporated by reference.

FIELD OF THE INVENTION

Present disclosure relates to a vortex laser generation device and a vortex laser generation method, and more particularly to a vortex laser generation device in a degenerate cavity with a spiral phase element and a vortex laser generation method.

BACKGROUND OF THE INVENTION

Vortex laser is a spiral phase beam, also known as a vortex beam. The vortex laser shows a spiral wavefront that changes in a spiral-like manner along the beam propagation direction and has a Poynting vector following a spiral trajectory around a beam axis.

It refers to the vortex beam having an arbitrary polarization and a spiral phase structure in a cross section. Compared with other beams, the vortex beam has special properties that can be used in many fields, such as high resolution imaging, laser precision machining, particle manipulation, data storage, and remote sensing.

There are many methods for generating vortex beams, such as static spiral phase plate (SPP), computer-generated holography, and mode conversion. Since conventional laser cavity can hardly generate a vortex beam directly, it must be modulated by a vortex element placed outside the laser cavity. The vortex beam generated by the mode conversion needs to be incident by the laser beam after shaping, such as Hermite-Gaussian beams, causing the system complex. The conversion efficiency of the static spiral phase plate is limited and the quality of the vortex beam is poor. In addition, holography is widely used, however, its diffraction efficiency is low, and the light path of the diffractive element is complicated so that the quality of the vortex beam is poor.

As a result, it is necessary to provide a vortex laser generation device in a degenerate cavity with a spiral phase element and a vortex laser generation method to solve the problems existing in the conventional technologies, as described above.

SUMMARY OF THE INVENTION

An object of present disclosure is to provide a vortex laser generation device in a degenerate cavity with a spiral phase element and a vortex laser generation method, wherein off-axis beams that travels multiple pass to complete a round trip in laser cavity are formed to resonate and coherently combined so that vortex laser with orbital angular momentum can be generated.

To achieve the above object, present disclosure provides a vortex laser generation device in a degenerate cavity with a spiral phase element, which comprises a degenerate cavity, wherein the degenerate cavity includes a resonator mirror, a gain medium, an optical element and an output coupler; the resonator mirror is configured to receive a pump beam and reflect a resonating beam; the gain medium is disposed behind the resonator mirror; the optical element is configured to break an azimuthal symmetry of lasers and be disposed behind the gain medium; the output coupler us disposed behind the optical element, wherein the pump beam is emitted into the gain medium through the resonator mirror so that the gain medium absorbs the pump beam to generate the lasers, and then the lasers pass through the optical element and reflect between the resonator mirror and the output coupler for thus being a multiple pass transverse mode to form vortex lasers, and the vortex lasers are output by transmitting through the output coupler.

In one embodiment of present disclosure, the vortex laser generation device further comprises a pump source and a focusing lens, wherein the pump source is configured to generate the pump beam, and the focusing lens is disposed behind the pump source to focus the pump beam, wherein the degenerate cavity is disposed behind the focusing lens.

In one embodiment of present disclosure, the optical element modulates spiral phases and is made of polymer replicated on a glass substrate.

In one embodiment of present disclosure, the optical element and the output coupler are integrally assembled to be a single component.

In one embodiment of present disclosure, the output coupler is a concave mirror, and a curvature radius of the output coupler is 100% to 120% of a total length of the degenerate cavity.

In one embodiment of present disclosure, a concave surface of the output coupler is coated with a reflective coating film, and a transmittance of the reflective coating film is less than 10% for the laser beam.

In one embodiment of present disclosure, the gain medium comprises a flat surface, and the flat surface is coated with a highly reflective coating film to thus form the resonator mirror.

In one embodiment of present disclosure, a reflectivity of the highly reflective coating film is more than 99.9%.

To achieve the above object, present disclosure provides a vortex laser generation method, the method comprises steps of: an input step of adding an energy into a gain medium of a degenerate cavity so that the gain medium generates lasers; an azimuthal symmetry breaking step of guiding the laser to pass through an optical element of the degenerate cavity so that an azimuthal symmetry of the lasers is broken; a reflection step of reflecting the lasers between a resonator mirror and an output coupler of the degenerate cavity for thus being a multiple pass transverse mode to form vortex lasers; and an output step of outputting the vortex lasers by transmitting through the output coupler.

In one embodiment of present disclosure, the energy is a voltage or a pump beam.

As described above, the degenerate cavity can generate the multiple pass transverse mode so that the off-axis beams of the laser can be formed a resonant mode, wherein azimuthal symmetry breaking introduced by optical element such as spiral phase plate hinders on-axis beams of the laser to resonate, and pump energy utilization of the off-axis beams can be improved. Thus, a stability of the vortex laser and an extensibility of power can be increased. In addition, the optical element can modulate a spatial phase distribution of the off-axis beams, and the off-axis beams are interfered with each other and stimulated amplified through the gain medium so that the off-axis beams in all directions are built up with high spatial coherences. Eventually, the off-axis beams are phase locked to form vortex laser, and the quality of the vortex laser can be improved.

DETAILED DESCRIPTION OF THE PREFERRED EMBODIMENTS

The structure and the technical means adopted by present disclosure to achieve the above and other objects can be best understood by referring to the following detailed description of the preferred embodiments and the accompanying drawings. Furthermore, directional terms described by present disclosure, such as upper, lower, front, back, left, right, inner, outer, side, longitudinal/vertical, transverse/horizontal, etc., are only directions by referring to the accompanying drawings, and thus the used directional terms are used to describe and understand present disclosure, but present disclosure is not limited thereto.

Figure 1:
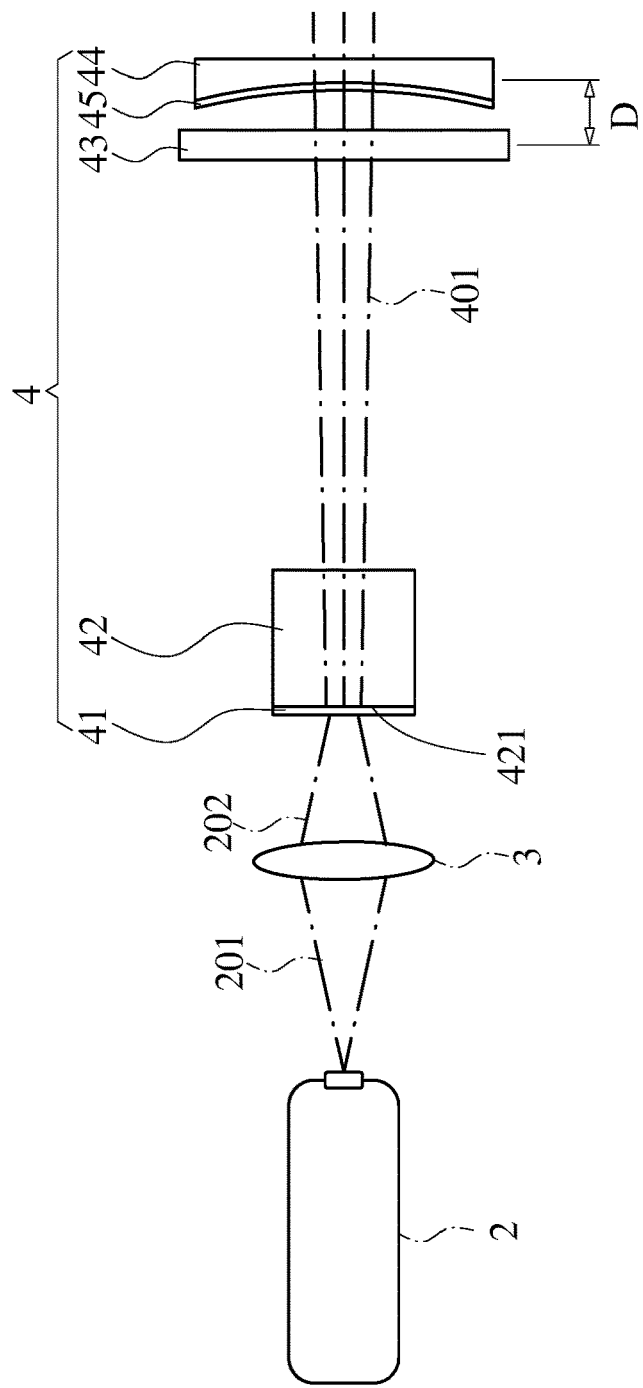
FIG. 1 is a schematic view of a vortex laser generation device in a degenerate cavity with a spiral phase element according to a preferred embodiment of present disclosure.
Figure 2:
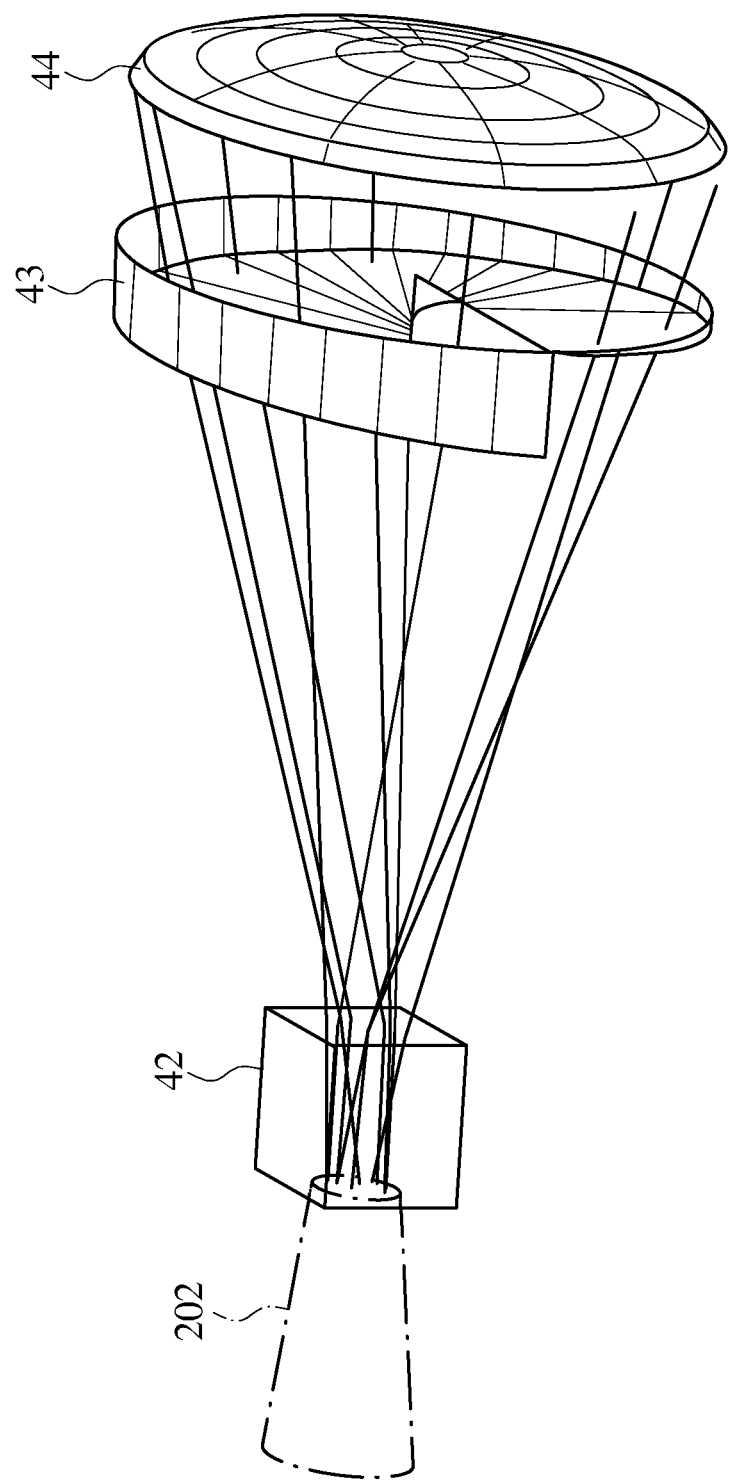
FIG. 2 is a schematic view of the degenerate cavity existing beams with V-shaped trajectory of the vortex laser generation device according to a preferred embodiment of present disclosure.

Referring to FIGS. 1 and 2, a vortex laser generation device in a degenerate cavity with a spiral phase element according to a preferred embodiment of present disclosure is illustrated. As shown, the vortex laser generation device comprises a pump source 2, a focusing lens 3, and a degenerate cavity 4. The detailed structure of each component, assembly relationships, and principles of operation in present disclosure will be described in detail hereinafter.

Referring to FIGS. 1 and 2, the pump source 2 is configured to generate a pump beam 201. The focusing lens 3 is disposed behind the pump source 2 to focus the pump beam 201 for generating a focused pump beam 202, wherein the degenerate cavity is disposed behind the focusing lens. In the embodiment, the pump source 2 is a laser diode, and the pump beam 201 has a wavelength of 808 nm. The pump beam 201 is focused by the focusing lens 3 of focal length of 50 mm.

Referring to FIGS. 1 and 2, the degenerate cavity 4 is disposed behind the focusing lens 3. The degenerate cavity 4 comprises a resonator mirror 41, a gain medium 42, an optical element 43 and an output coupler 44, wherein the resonator mirror 41 is configured to receive the pump beam 202, the gain medium 42 is disposed behind the resonator mirror 41, the optical element 43 is configured to break an azimuthal symmetry of lasers and be disposed behind the gain medium 42, and the output coupler 44 is disposed behind the optical element. In the embodiment, the optical element 43 and the output coupler 44 are integrally assembled to be a single component.

Furthermore, referring FIGS. 1 and 2, the gain medium 42 comprises a flat surface 421, and the flat surface 421 is coated with a highly reflective coating film to thus form the resonator mirror 41. The optical element 43 is a spiral phase plate (SPP) and modulates spiral phases, and the spiral phase plate has a topological charge of +1, wherein the optical element 43 is made of polymer replicated(coated) on a glass substrate is located in the degenerate cavity 4 close to the output coupler 44.

In the embodiment, Nd:YAG crystal (doped at 0.5% atomic percentage) is chosen as the gain media 42 because its isotropic property simplifies the vortex generation scenario. The difference in the thickness of the optical element 43 (spiral phase plate) is 6.25 mm to 6.25075 mm, wherein the orbital angular momentum (OAM) is higher as the difference in the thickness of the spiral phase plate is increased. A distance D between the optical element 43 and the output coupler 44, and the distance D is less than a total length of 5% of the degenerate cavity 4. In addition, a reflectivity of the highly reflective coating film is more than 99.9%.

Furthermore, referring FIGS. 1 and 2, the output coupler 44 is a concave mirror, and a curvature radius of the output coupler is 100% to 120% of a total length of the degenerate cavity 4. In addition, a concave surface of the output coupler 44 is coated with a reflective coating film 45, and a transmittance of the reflective coating film 45 is less than 10% for the laser beam.

Figure 3:
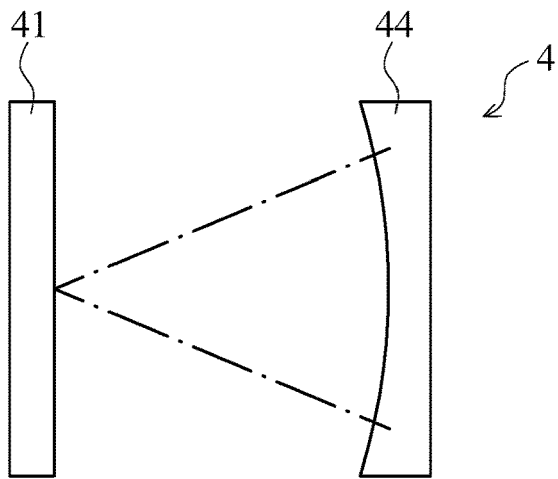
FIG. 3 is a schematic view of the degenerate cavity existing multiple pass transverse mode of the vortex laser generation device according to a preferred embodiment of present disclosure.

According to the described structure, the pump beam 202 is emitted into the gain medium 42 through the resonator mirror 41 so that the gain medium 42 absorbs the pump beam 202 to generate the lasers 401, wherein the lasers 401 have a wavelength of 1064 nm, and then the lasers 401 pass through the optical element 43 and reflect between the resonator mirror 41 and the output coupler 44 for thus being a multiple pass transverse mode (MPT) to form vortex lasers (as shown in FIG. 2), and the vortex lasers are output by transmitting through the output coupler 44. In the embodiment, the degenerate cavity 4 is formed with twice pass transverse mode, and the twice pass transverse mode is an off-axis mode. The trajectory of the beams (such as lasers 401) are formed V-shaped (as shown in FIG. 3). Since a plurality of beams with the V-shaped trajectory exist in the degenerate cavity 4 to form a cone shape, the beams are transmitted through the output coupler 44 to output the vortex lasers.

Furthermore, the azimuthal symmetry of the lasers is broken by disposing the optical element 43 in the degenerate cavity 4 so that the degenerate cavity 4 generates the multiple pass transverse mode, wherein off-axis beams of the laser can be formed a resonant mode. The off-axis beams of the laser are coupled with each other in the resonant mode and stimulated amplified in the gain medium 42. Thus, spatial coherence is built up in the resonant mode to form vortex laser with orbital angular momentum (OAM), also known as optical vortex.

As described above, the degenerate cavity 4 can generate the multiple pass transverse mode so that the off-axis beams of the laser can be formed a resonant mode, wherein azimuthal symmetry breaking introduced by optical element 43 such as spiral phase plate hinders on-axis beams of the laser which are known as Laguerre Gaussian or Hermite Gaussian beams to resonate, and pump energy utilization of the off-axis beams can be improved. Thus, a stability of the vortex laser and an extensibility of power can be increased. In addition, the optical element 43 can modulate a spatial phase distribution of the off-axis beams, and the off-axis beams are interfered with each other and stimulated amplified through the gain medium 42 so that the off-axis beams in all directions are built up with high spatial coherences. Eventually, the off-axis beams are phase locked to form vortex laser, wherein spiral purity of the vortex laser can reach above 99%, and the quality of the vortex laser can be improved.

Figure 4:
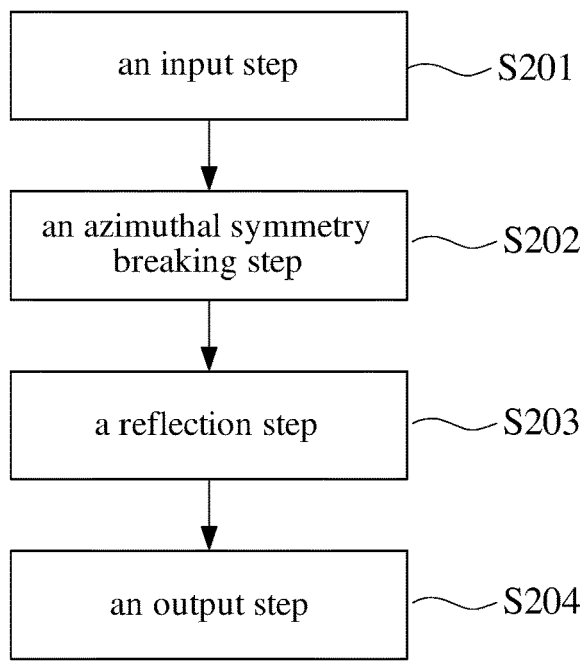
FIG. 4 is a flowchart of a vortex laser generation method according to a preferred embodiment of present disclosure.

Referring to FIG. 4 in conjunction with FIG. 1, a vortex laser generation method according to a preferred embodiment of present disclosure is provided and operated by said vortex laser generation device, wherein the vortex laser generation method comprises an input step S201, an azimuthal symmetry breaking step S202, a reflection step S203 and an output step S204. The detailed principles of operation in present disclosure will be described in detail hereinafter.

Referring to FIG. 4 in conjunction with FIGS. 1 and 2, in the input step S201, an energy is added into a gain medium 42 of a degenerate cavity 4 so that the gain medium 42 generates lasers 401. In the embodiment, the energy is a pump beam 202, and the pump beam 202 generated through a pump source 2 and a focusing lens 3. However, the energy also be a voltage in other embodiment.

Referring to FIG. 4 in conjunction with FIGS. 1 and 2, in the azimuthal symmetry breaking step S202, the lasers 401 are guided to pass through an optical element 43 of the degenerate cavity 4 so that an azimuthal symmetry of the lasers 401 is broken.

Referring to FIG. 4 in conjunction with FIGS. 1 and 2, in the reflection step S203, the lasers 401 are reflected between a resonator mirror 41 and an output coupler 44 of the degenerate cavity 4 for thus being a multi-pass transverse mode to form vortex lasers. Finally, in the output step S204, the vortex lasers are output by transmitting through the output coupler 44.

As described above, the degenerate cavity 4 can generate the multiple pass transverse mode so that the off-axis beams of the laser can be formed a resonant mode, wherein azimuthal symmetry breaking introduced by optical element 43 such as spiral phase plate hinders on-axis beams of the laser which are known as Laguerre Gaussian or Hermite Gaussian beams to resonate, and pump energy utilization of the off-axis beams can be improved. Thus, a stability of the vortex laser and an extensibility of power can be increased. In addition, the optical element 43 can modulate a spatial phase distribution of the off-axis beams, and the off-axis beams are interfered with each other and stimulated amplified through the gain medium 42 so that the off-axis beams in all directions are built up with high spatial coherences. Eventually, the off-axis beams are phase locked to form vortex laser, wherein spiral purity of the vortex laser can reach above 99%, and the quality of the vortex laser can be improved.

The present disclosure has been described with preferred embodiments thereof and it is understood that many changes and modifications to the described embodiments can be carried out without departing from the scope and the spirit of the invention that is intended to be limited only by the appended claims.

What is claimed is:

1. A vortex laser generation device in a degenerate cavity with a spiral phase element, comprising:
   a degenerate cavity, including:
      a resonator mirror configured to receive a pump beam;
      a gain medium disposed behind the resonator mirror;
      an optical element configured to break an azimuthal symmetry of lasers and be disposed behind the gain medium; and
      an output coupler disposed behind the optical element;
   wherein the pump beam is emitted into the gain medium through the resonator mirror so that the gain medium absorbs the pump beam to generate the lasers, and then the lasers pass through the optical element and reflect between the resonator mirror and the output coupler for thus being a multiple pass transverse mode to form vortex lasers, and the vortex lasers are output by transmitting through the output coupler.

2. The vortex laser generation device according to claim 1, wherein the vortex laser generation device further comprises:
   a pump source configured to generate the pump beam; and
   a focusing lens disposed behind the pump source to focus the pump beam,
   wherein the degenerate cavity is disposed behind the focusing lens.

3. The vortex laser generation device according to claim 2, wherein the optical element modulates spiral phases.

4. The vortex laser generation device according to claim 2, wherein the optical element and the output coupler are integrally assembled to be a single component.

5. The vortex laser generation device according to claim 1, wherein the output coupler is a concave mirror, and a curvature radius of the output coupler is 100% to 120% of a total length of the degenerate cavity.

6. The vortex laser generation device according to claim 5, wherein a concave surface of the output coupler is coated with a reflective coating film, and a transmittance of the reflective coating film is less than 10%.

7. The vortex laser generation device according to claim 1, wherein the gain medium comprises a flat surface, and the flat surface is coated with a highly reflective coating film to thus form the resonator mirror.

8. The vortex laser generation device according to claim 7, wherein a reflectivity of the highly reflective coating film is more than 99.9%.

* * * * *